United States Patent [19]

Honda et al.

[11] Patent Number: 4,812,429
[45] Date of Patent: Mar. 14, 1989

[54] METHOD FOR CLEANING WASTE GAS DENITRATING CATALYST

[75] Inventors: Mitsuyasu Honda; Touru Seto; Shigeaki Mitsuoka, all of Hiroshima, Japan

[73] Assignee: Mitsubishi Jukogyo Kabushiki Kaisha

[21] Appl. No.: 124,667

[22] Filed: Nov. 24, 1987

[30] Foreign Application Priority Data

Dec. 4, 1986 [JP] Japan ................. 61-287694

[51] Int. Cl.⁴ .................. B01J 38/04; B01J 38/00; B01J 23/92; B01D 53/36
[52] U.S. Cl. .................. 502/34; 422/178; 423/215.5; 423/239; 502/20
[58] Field of Search .................. 502/20, 21, 34; 423/215.5, 239 A

[56] References Cited

U.S. PATENT DOCUMENTS

| | | | |
|---|---|---|---|
| 930,947 | 8/1909 | Edison | 423/215.5 |
| 4,572,903 | 2/1986 | Hino et al. | 502/21 |
| 4,729,975 | 3/1988 | Kobayashi | 502/21 |

FOREIGN PATENT DOCUMENTS

| | | | |
|---|---|---|---|
| 27596 | 3/1964 | German Democratic Rep. | 502/20 |
| 52-39568 | 9/1975 | Japan . | |
| 37066 | 3/1979 | Japan | 502/21 |
| 76227 | 6/1981 | Japan | 502/21 |
| 255132 | 12/1985 | Japan | 423/239 A |
| 227847 | 10/1986 | Japan | 502/20 |
| 865490 | 4/1961 | United Kingdom | 502/21 |

*Primary Examiner*—Paul E. Konopka
*Attorney, Agent, or Firm*—Toren, McGeady & Associates

[57] ABSTRACT

In a reaction device in which catalyst layers having vertical passages for a waste gas are arranged, gas rectifying plates are disposed at regular intervals above the catalyst layers and these rectifying plates are each supported by a shaft at the upper portion thereof, moving the lower end portions of the adjacent rectifying plates into contact with each other so as to maintain a V-shape region for a predetermined period of time.

Collecting dust in the waste gas in the V-shape region formed by the rectifying plates and then dropping the dust downwardly onto the catalyst layers intermittently, and thereby cleaning the surfaces of the catalyst layers.

5 Claims, 2 Drawing Sheets

METHOD FOR CLEANING WASTE GAS DENITRATING CATALYST

FIELD OF THE INVENTION AND RELATED ART STATEMENT

The present invention relates to a method for cleaning a waste gas denitration catalyst, and more particularly it relates to a method for cleaning a catalyst which is used to treat the waste gas containing a high concentration of dust and coming from a coal-fired boiler or the like.

Heretofore, when harmful materials and dust are deposited on the surfaces of catalyst layers defining gas flow passages in a waste gas treatment such as denitration, the deposits have been removed therefrom by using a standing soot blower, by water washing, or by another means. In another case, a catalyst pack is detached from a reaction device, and deposits on and in the catalyst pack are eliminated therefrom by water washing and the cleaned catalyst pack is then reattached thereto.

The soot blower is effective to some extent for the removal of the deposited dust, but it is insufficient for the elimination of the harmful materials.

In the case of the water washing, various manners such as spray water washing, immersion water washing and the like can be taken, but any manner requires a complex device, and for example, a system for treating the waste liquid which has been used for the water washing and a cost of this treatment are additionally necessary, which is uneconomical.

Also in the case that a catalyst pack is taken out from the reaction device and is then washed with water, for example the investment in a waste liquid treating system and the much labor of this treatment are additionally required disadvantageously.

OBJECT AND SUMMARY OF THE INVENTION

In consequence, an object of the present invention is to provide a method for cleaning a waste gas denitrating catalyst by which the above-mentioned problems are solved and by which harmful materials deposited on the catalyst portions are inexpensively and easily removed therefrom.

That is, the present invention is directed to a method of cleaning a waste gas denitrating catalyst which is characterized by comprising the steps of disposing a plurality of gas rectifying plates at regular intervals above upright arrangement type denitrating catalyst layers, rotatively moving the rectifying plates so as to form a V-shape between the adjacent rectifying plates, collecting dust present in a waste gas by the V-shaped rectifying plates, causing the thus collected dust to fall into gas passage inlets of denitration catalyst layers successively in order to thereby move the dust deposited on the surfaces and edge faces of the catalyst layers therefrom, and repeating the above operation to forcedly wear and remove catalyst poisons deposited on and in the catalyst layers therefrom.

In the present invention, the rectifying plates are disposed at regular intervals above the catalyst layers, and an angle of the rectifying plates is changed temporarily so as to maintain a V-shaped arrangement like a collecting hopper between the adjacent rectifying plates and to thereby collect the dust on these plates. Afterward, the dust which has been collected and accumulated as much as a predetermined amount in the V-shaped regions is caused to fall onto the catalyst layers, so that the dust and the harmful materials deposited on the gas passage surfaces or edge faces of the catalyst layers are removed forcedly therefrom by means of a frictional function, thereby cleaning the catalyst layers.

In the present invention, a soot blower may be additionally used at the time when the dust is caused to fall, whereby the dust is jetted onto the catalyst layers in order to achieve a function like a sand blast.

DETAILED DESCRIPTION OF PREFERRED EMBODIMENTS

Figure 1:
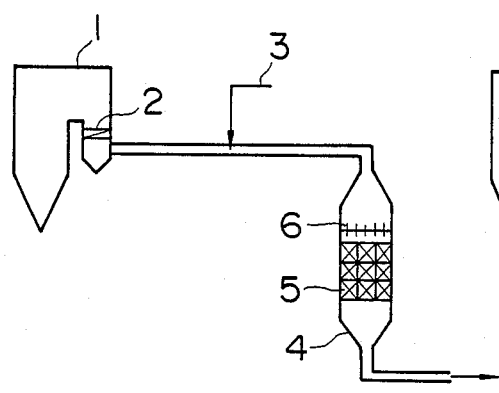
FIG. 1 shows one embodiment in which the present invention is applied to a coal-fired boiler.

Referring now to FIG. 1, reference numeral 1 represents a boiler body, and a boiler combustion waste gas is introduced from the boiler body 1 via an economizer 2 into the inlet of a device (hereinafter referred to as a denitrating reactor) 4 by the use of which the present invention is carried out. In this case, in order to render NOx present in the waste gas non-toxic, NH3 which is a reducing agent is injected through a line 3 into the upstream side of the denitrating reactor 4. In this denitrating reactor 4, denitrating catalyst layers 5 are arranged.

Gas rectifying plates 6 are disposed in the inlet portion of the denitrating reactor 4 by the use of fixing shafts 7. In general, the gas rectifying plates 6 are arranged in parallel with the flow direction of the waste gas.

Figure 2:
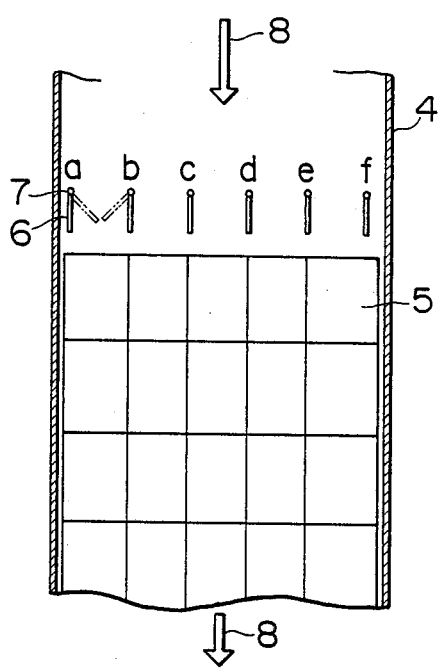
FIG. 2 is a detailed partial view of FIG. 1.

FIG. 2 shows a detailed disposition manner of the gas rectifying plate 6 in FIG. 1. Normally, the gas rectifying plates 6 are disposed in parallel with a gas flow 8 depicted by a solid line in FIG. 2, but in order to collect the dust present in the exhaust gas, the angle of each rectifying plate 6 is periodically altered so as to take a V-shape, as shown by dotted lines in FIG. 2. In this angular arrangement, a predetermined amount of the dust is collected in the V-shaped region. Next, the rectifying plates 6 are returned to the normal arrangement in parallel with the gas flow 8, and at this time, the dust falls onto the denitrating catalyst layers 5 disposed on the downstream side.

By means of the frictional function of the falling dust, there can be forcedly removed harmful materials deposited on internal surfaces of gas passages and the dust deposited on edge faces of the gas passages in the catalyst layers 5.

The operation of the above-mentioned angle alternation is periodically repeated in turn from a to f of the gas rectifying plates 6 in FIG. 2, whereby the dust collection on the rectifying plates and the dust fall therefrom are repeated, with the result that the harmful materials deposited on and in the catalyst layers 5 can be reduced up to a minimum level.

Figure 3:
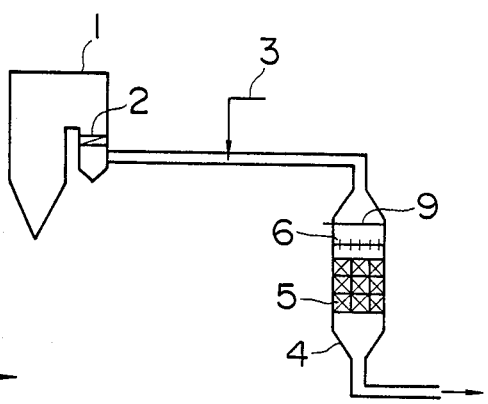
FIG. 3 shows another embodiment of the present invention.
Figure 4:
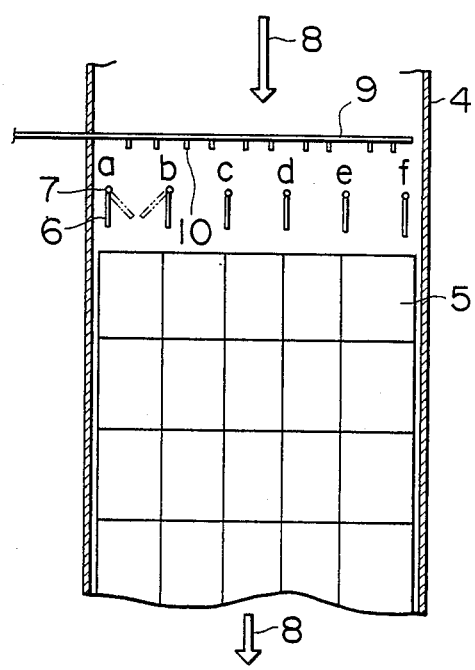
FIG. 4 is a detailed partial view of FIG. 3.

FIG. 3 shows another embodiment in which the present invention is applied to the coal-fired boiler. In this drawing, a soot blower 9 is provided on the upstream side of the gas rectifying plates 6 in the denitrating reactor 4. FIG. 4 is a detailed view illustrating an arrangement manner of these gas rectifying plates 6 and the soot blower 9.

Also with regard to the gas rectifying plates 6 in FIGS. 3 and 4, the angle alternation is carried out as in FIGS. 1 and 2, and the dust is collected on the V-shaped rectifying plates. After a predetermined amount of the dust has been collected, the rectifying plates 6 are angularly changed to return to the normal position. At this time, a high-pressure gas is jetted through jet nozzles 10 of the soot blower 9, so that the thus collected dust is jetted against the catalyst layers 5.

In this case, an interval between the jet nozzles 10 and the top level of the catalyst layers 5 is preferably 2.5 m or less, and a jet rate of the high-pressure gas is preferably from 20 to 30 m/sec.

The operation of the above-mentioned angle alternation is periodically repeated in turn from a to f of the gas rectifying plates 6 in FIG. 4, whereby the harmful materials deposited on the catalyst portions can be reduced up to a minimum level.

Incidentally, FIG. 4 shows the state that the jet nozzles 10 are previously fixed at predetermined positions, but a small number of the nozzles may be constituted so as to move successively along the collecting positions a to f, or alternatively so as to move in both right and left directions.

For the purpose of confirming the functional effect of the present invention, the following experiment was carried out:

Lattice-like catalysts (each of which had a size of 15 cm$^2$ × 80 cm in length), which were composed of 80% of TiO$_2$, 15% of WO$_3$ and 5% of an active component (V$_2$O$_5$, Mo or Fe), were arranged in a two-step stack in order to form the catalyst layers 5 (a sectional area of which was 8 m × 10 m) in the apparatus in FIGS. 1 and 2 or FIGS. 3 and 4, and a coal-fired boiler waste gas having the following properties was subjected to a denitration treatment:

SOx: 800 to 1,000 ppm
NOx: 200 to 250 ppm
CO$_2$: 11 to 13%
O$_2$: 10 to 11%
Dust Concentration: 5 to 25 g/Nm$^3$ (containing Ca, Na, K, As and the like which were deleterious components to the catalyst)
Gas Feed: 500,000 Nm$^3$/h
Gas Flow Rate: 5 to 6 m/sec.

Figure 5:
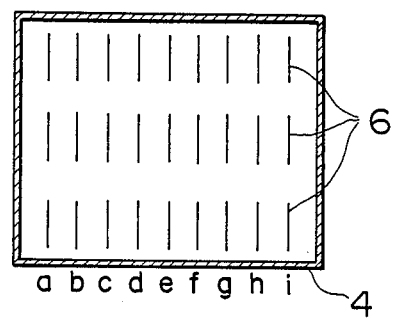
FIG. 5 shows one embodiment of the disposition manner of gas rectifying plates used in the present invention.

The gas rectifying plates 6 were arranged at regular intervals as shown in FIG. 5 in both the cases of the apparatuses in FIGS. 1 and 2 as well as FIGS. 3 and 4.

In FIG. 5, reference numeral 4 represents a denitrating reactor in a plan view, and the gas rectifying plates 6 were divided into 3 groups in each of which the nine plates 6 were arranged in parallel with each other. The denitrating reactor 4 had a rectangular section of 8 m in depth and 10 m in width.

Figure 6:
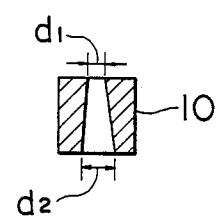
FIG. 6 shows an exemplary shape of a soot blower nozzle used in the present invention.
Figure 7:
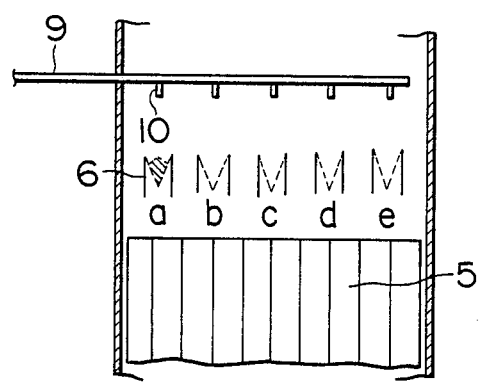
FIG. 7 shows one embodiment of the description manner of the soot blower used in the present invention.

The jet nozzles 10 of the soot blower 9 in FIGS. 3 and 4 had such a divergent shape as in FIG. 6 and were arranged as in FIG. 7.

With regard to each jet nozzle, its inlet diameter was 4 to 6 mm, and its outlet diameter was 8 to 10 mm.

Operative conditions of the apparatuses in FIGS. 1 and 2 as well as FIGS. 3 and 4 are set forth in the following table.

For comparison, a catalyst cleaning operation in which a conventional soot blower was used was also carried out, and the conditions for this conventional embodiment are also set forth in the following table.

| Embodiment 1 of Present Invention (apparatus in FIGS. 1 and 2) | Embodiment 2 of Present Invention (apparatus in FIGS. 3 and 4) | Conventional Embodiment |
| --- | --- | --- |
| 1 time/day, 3 min/time in one cyle Amount of collected dust was 20 to 30 kg. | 1 time/day, 3 min/time in one cyle Amount of collected dust was 20 to 30 kg. Jet velocity of soot blower was 20 to 30 m/sec (flow rate on edge faces of catalyst layers). | 5 to 10 times/day, 20 sec/time Jet velocity of soot blower was 20 to 25 m/sec (flow rate on edge faces of catalyst layers). |

The results of the above-mentioned experiments are as follows: The initial performance of the catalyst layers was 90% (which meant the ability that 90% of NOx present in the waste gas was reacted with NH$_3$ which was a reducing agent, in order to decompose it into nontoxic N$_2$ and H$_2$O), and after one year, the performance was lowered to 82% in Embodiment 1 of the present invention, 85% in Embodiment 2 of the present invention, and 75% in the conventional embodiment which was indicative of a remarkable deterioration. Further, the initial pressure loss of the catalyst layers was 80 mm H$_2$O, and after one year, the pressure loss was increased up to 100 mm H$_2$O in Embodiment 1 of the present invention, 90 mm H$_2$O in Embodiment 2 of the present invention, and 120 mm H$_2$O in the conventional embodiment which was indicative of a remarkable increase in the pressure loss.

As is definite from the above, according to the present invention, a long-term stability of the catalyst performance and a less increase in the catalyst layer pressure loss can be obtained, and in addition, a less deposition of the harmful materials can also be intended.

Furthermore, in the method of the present invention, equipment costs and treatment costs are lower than in the case that water washing is carried out in the conventional denitrating device. Additionally, in the present invention, the treatment costs are also lower as compared with the case that a catalyst pack taken out from the conventional denitrating device is washed with water. Moreover, the cleaning operation can be carried out, while the denitrating operation makes progress.

We claim:

1. A method for cleaning a waste gas denitrating catalyst which is characterized by comprising the steps of disposing a plurality of gas rectifying paltes at regular intervals above an upright arrangement of denitrating catalyst layers, said gas rectifying plates being parallel to each other and each of them being supported by a rotational axis attached to it in its longitudinal direction, rotatively moving said rectifying plates so as to form a V-shape between said adjacent rectifying plates, collecting dust present in said waste gas by said V-shaped rectifying plates, causing the thus collected dust to fall into gas passage inlets of denitrating catalyst layers successively in order to thereby remove said dust deposited on the surfaces and the edge faces of said catalyst layers therefrom, and repeating the above operation to forcedly wear and remove catalyst poisons deposited on and in said catalyst layers by the falling dust.

2. A method for cleaning a waste gas denitrating catalyst according to claim 1 wherein disposing a soot blower above said gas rectifying plates, and jetting a high-pressure gas from said soot blower toward said dust simultaneously with the fall of said dust from said V-shaped rectifying plates.

3. A method of cleaning a waste gas denitrating catalyst in a vertically extending denitrating reactor having an upper end and a lower end, comprising the steps of locating a waste gas inlet in the upper end of the reactor, positioning an upright arrangement of denitrating catalyst layers in the reactor spaced downwardly from the waste gas inlet, arranging a plurality of gas rectifying plates in generally parallel spaced upright relation between the inlet and the denitrating layers so that waste gas flows downwardly from the inlet past the plates to the catalyst layers, supporting upper ends of said gas rectifying plates for rotating each of said plates about a horizontal axis at an upper end thereof, during downward flow of dust laden waste gas through the inlet over the denitrating catalyst layers selectively rotating adjacent pairs of said gas rectifying plates so that the lower ends thereof move toward one another forming a V-shaped collection region between the pair of plates above the denitrating catalyst layers, collecting dust present in the waste gas in the V-shaped collecting region, rotating the gas rectifying plates forming the V-shaped region back to the parallel arrangement thereof and thereby dropping dust from the V-shaped region downwardly over the denitrating layers in the downward direction of flow of the waste gas and by means of the downwardly flowing dust removing dust deposited on the surfaces and edge faces of the catalyst layers, and periodically moving pairs of the adjacent dust rectifying plates for forming V-shaped regions and returning the rectifying plates to the parallel relation for dropping dust collected in the V-shaped region and forcedly wearing and removing catalyst poisons deposited on and in the catalyst layers.

4. A method of cleaning a waste gas denitrating catalyst according to claim 3, comprising the steps of disposing a soot blower within the reactor between the waste gas inlet and the gas rectifying plates, and jetting a high pressure gas from the soot blower downwardly toward the dust collected in the V-shaped region simultaneously with the fall of the dust from the V-shaped region toward the denitrating catalyst layers.

5. A method of cleaning a waste gas denitrating catalyst according to claim 4, including the step of forming nozzles in the soot blower with the nozzles diverging downwardly and with the nozzles having an upper end and a downward end, forming the upper end of the nozzles with a diameter in the range of 4 to 6 mm and forming the lower end of the nozzles with a diameter in the range of 8 to 10 mm.

* * * * *